United States Patent [19]

Kervagoret

[11] Patent Number: 5,186,093
[45] Date of Patent: Feb. 16, 1993

[54] ELECTRICALLY CONTROLLED PRESSURE-REGULATING SYSTEM FOR A HYDRAULIC CIRCUIT

[75] Inventor: Gilbert Kervagoret, Argenteuil, France

[73] Assignee: Bendix Europe Services Techniques, Drancy, France

[21] Appl. No.: 674,473

[22] Filed: Mar. 25, 1991

[30] Foreign Application Priority Data

Apr. 12, 1990 [FR] France ................. 90 04702

[51] Int. Cl.$^5$ .......................................... F15B 13/044
[52] U.S. Cl. .............................. 91/433; 91/31; 91/459; 137/596.17; 137/625.65; 303/119.2
[58] Field of Search ................. 91/31, 433, 459; 137/596.17, 625.65; 303/119 SV

[56] References Cited

U.S. PATENT DOCUMENTS

| | | | |
|---|---|---|---|
| 3,880,476 | 4/1975 | Belart et al. | 137/625.65 X |
| 3,995,652 | 12/1976 | Belart et al. | 137/625.65 X |
| 4,478,250 | 10/1984 | Lukasczyk et al. | 137/625.65 |
| 4,485,843 | 12/1974 | Wolff | 137/529 X |
| 4,643,225 | 2/1987 | Imhof | 137/625.65 X |
| 4,744,389 | 5/1988 | Ichihashi | 137/625.65 |

FOREIGN PATENT DOCUMENTS

| | | |
|---|---|---|
| 227209 | 7/1987 | European Pat. Off. . |
| 3119445 | 2/1982 | Fed. Rep. of Germany . |
| 2503893 | 4/1982 | France . |
| 211409 | 9/1988 | Japan ................. 137/625.65 |

Primary Examiner—Gerald A. Michalsky
Attorney, Agent, or Firm—Larry J. Palguta; Ken C. Decker

[57] ABSTRACT

The pressure-regulating system for a hydraulic circuit, comprises at least one generator (22) of fluid under pressure, a hydraulic motor (20), a reservoir (24) of fluid under low pressure and a solenoid valve controlled by a computer and comprising an electrical coil (1) and a sliding magnetic core (3) controlling a slide (7) which slides in a bore provided in a body (9). The slide (7) defines two chambers (11, 15) arranged on either side of the slide (7) in the bore, and it comprises a hydraulic cell (26) communicating with the hydraulic motor (20) and determining a reaction force added to the force generated by the coil (1), counter to a prestressed elastic means (131) and to a return spring (132) returning the slide (7) and the core (3) to the rest position.

4 Claims, 2 Drawing Sheets

ELECTRICALLY CONTROLLED PRESSURE-REGULATING SYSTEM FOR A HYDRAULIC CIRCUIT

BACKGROUND OF THE INVENTION

The invention relates to an electrically controlled pressure-regulating system for a hydraulic circuit.

It is designed especially for the brake systems of motor vehicles with anti-lock wheel-braking. Present anti-lock systems make use, between a generator of fluid under pressure and a hydraulic motor, of a solenoid valve controlled by a computer as a function of signals representing the rotation of the wheels of the vehicle, in order, in general terms, to relieve the pressure of the fluid in the hydraulic motor when the computer detects the imminent locking of a wheel, and then to connect a second source of fluid under pressure so as to increase the pressure once again until imminent locking is detected once more, the cycle then being repeated.

The solenoid valve used is a solenoid valve functioning in the all-or-nothing mode. Now the anti-lock cycle occurs over a certain amount of time, during which the solenoid valve changes states on very many occasions within a very short time. This gives rise to an unpleasant hammering noise caused by the moveable part of the solenoid valve.

Moreover, since the system functions in the all-or-nothing mode, pressure surges occur in the brakes, thus generating poorly controlled transient states.

An object of the present invention is to overcome these disadvantages by using a so-called proportional solenoid valve ensuring, in the working circuit, a hydraulic pressure which is a function of the current circulating in the coil of the solenoid valve, within a specific range of movement of the magnetic core of the solenoid valve.

The advantage of such a solenoid valve is, therefore, that it can be controlled simply by varying the current circulating in the coil, without the need for any hammering of the moveable part; this consequently results in a pronounced reduction of the pressure surges in the brakes. Furthermore, such a solenoid valve can easily be controlled by a computer which ensures a variable-frequency cutoff of a direct current, such as is found on board a motor vehicle, or a fixed-frequency cutoff with a variable cyclic ratio, the intensity of the current integrated by the coil then being a function of the cyclic ratio.

Such a solenoid valve is described, for example, in U.S. Pat. No. 4,744,389. However, the solenoid valve described in this document cannot be arranged in a hydraulic anti-lock wheel-braking circuit because of the pressures employed especially during the energization of the solenoid valve. If fact, the solenoid valve of this document is designed to function permanently in a system for regulating a relatively low pressure. This physical limitation therefore precludes the use of such a solenoid valve for high pressures in the hydraulic motor. Moreover, this solenoid valve does not make it possible to vary the hydraulic pressure in inverse proportion to the intensity of the current circulating in the coil.

SUMMARY OF THE INVENTION

An object of the present invention is to provide a solenoid valve making it possible to vary the hydraulic pressure in inverse proportion to the intensity of the current circulating in the coil and capable of being energized at a high pressure in the hydraulic circuit.

The subject of the present invention is, therefore, a pressure-regulating system for a hydraulic circuit, comprising at least one generator of fluid under pressure, a hydraulic motor and a reservoir of fluid under low pressure and including a solenoid valve controlled by a computer and comprising an electrical coil and a sliding magnetic core controlling a slide which slides in a bore provided in a body, the slide defining two chambers arranged on either side of the slide in the bore.

According to the invention, the slide comprises a hydraulic cell communicating with the hydraulic motor and determining a reaction force added to the force generated by the coil, counter to a prestressed elastic means and to a return spring returning the slide and the core to the rest position.

Preferably, the cell consists of a blind bore made in the slide, whilst a needle bearing on the body closes the cell substantially sealingly, a radial duct putting it in communication with a groove provided on the periphery of the slide.

BRIEF DESCRIPTION OF THE DRAWINGS

The invention will now be described by way of example with reference to the accompanying drawings in which.

DETAILED DESCRIPTION OF THE INVENTION

It is known that the coil of so-called proportional solenoid valves has the essential characteristic of being capable of supplying a substantially constant force for a specific current within an appreciable range of movement of the magnetic core of the order of 2 to 3 mm. This characteristic is generally obtained by means of a special geometry of the pole pieces. This characteristic is utilized in the present invention in order to ensure the requisite function by modulating the current circulating in the coil, so as to prevent a functioning in which a moveable part experiences very rapid hammering.

Figure 1:
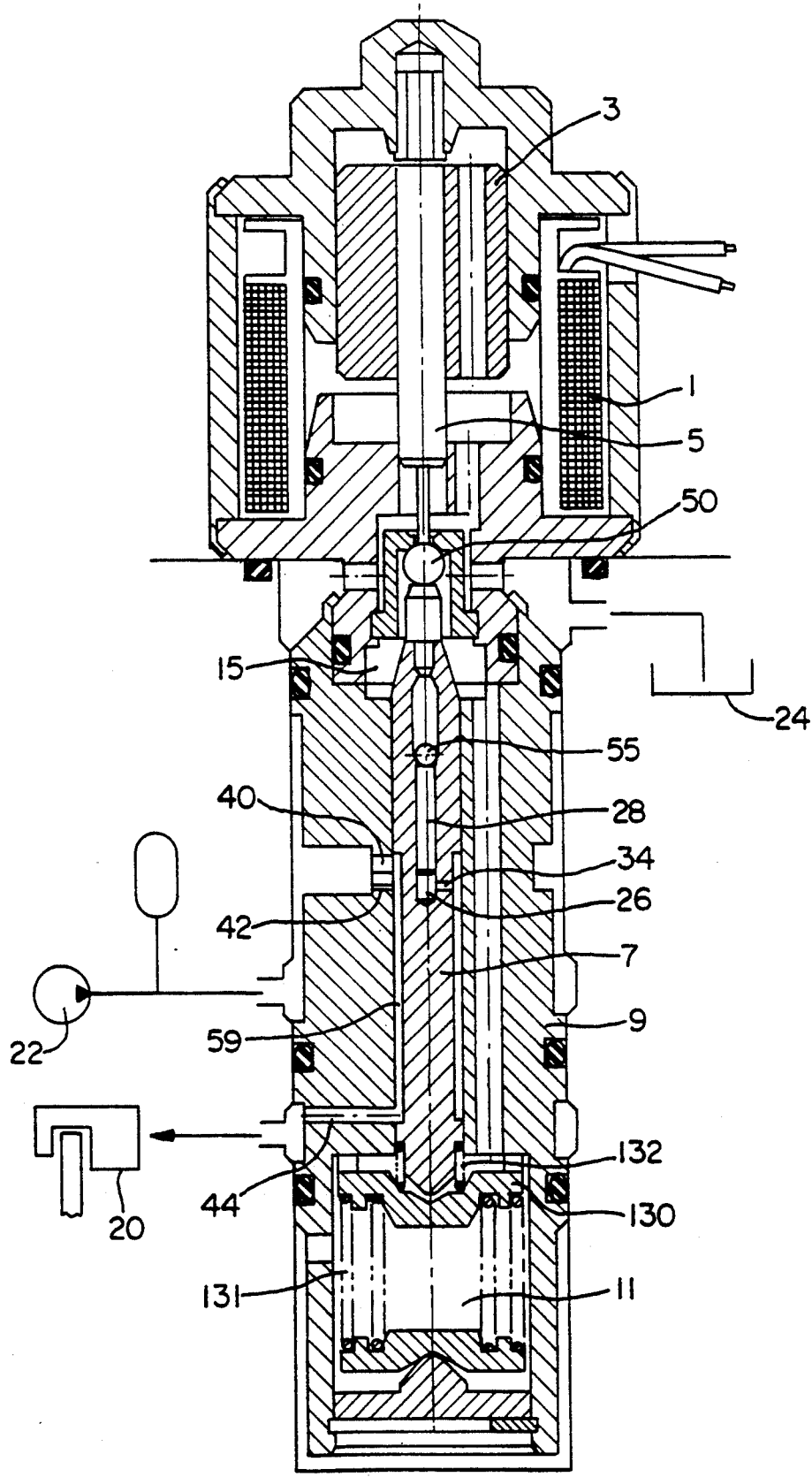
FIG. 1 shows diagrammatically, in section, an embodiment of a system according to the present invention, in the rest position.

FIG. 1 shows such a solenoid valve comprising an energizing coil 1 and a sliding magnetic core 3 equipped with its pusher 5 bearing on a slide 7 sliding in a bore of a body 9. At least one prestressed spring 131 is arranged in the chamber 11, for example between two pivoting disks, one bearing on the bottom of the bore of the chamber 11 and the other, the disk 130, being, at rest, up against a shoulder of the bore. Arranged between this disk 130 and the slide 7 is a return spring 132 of a rigidity necessary for returning the slide to the rest position, as shown.

The slide 7 is machined so as to be capable of opening or closing communication between a working hydraulic motor 20, a source of fluid under pressure 22 and a reservoir 24 according to the generally used systems for regulating hydraulic pressure. For this purpose, a groove 59 is provided on the periphery of the slide 7.

The two chambers 11 and 15 arranged on either side of the slide 7 in the bore are subjected to the same pressure. A cell 26, consisting of a blind bore made in the slide 7, determines the reaction force added to the force generated by the coil 1. This cell 26 is closed substantially sealingly by means of a needle 28 bearing on the body 9 by means of a stop 55 and communicates with the groove 59 by way of a radial duct 34.

In the rest position, as shown, the source of fluid under pressure 22 is in communication with the hydraulic motor 20 by means of the groove 59, and the cell 26 is in communication with the motor 20. The two end chambers 11 and 15 communicate with one another and are isolated from the reservoir 24 by means of a valve 50.

When the solenoid valve is energized, for example during a wheel anti-lock period in the preferred application of the invention, first of all the current circulating in the coil generates a force opposing that of the spring 132, whatever the pressure prevailing in the hydraulic circuit. This makes it possible, in particular, for the solenoid valve not to have a high electrical consumption. The movement of the slide 7 counter to the return spring 132 first opens the valve 50 and puts the chambers 11 and 15 in communication with the reservoir 24, before the current in the coil 1 reaches its maximum intensity. Then, with the intensity at its maximum, the slide 7 is up against the disk 130, and its movement counter to the spring 131 closes the conduit 40 and the restriction 42, thereby isolating the source of fluid under pressure 22. Because of the position of the groove 59, the latter communicates with the chamber 11 and therefore with the reservoir 24. A relief of the pressure of the fluid in the motor therefore takes place. It will have been appreciated that the movement of the slide 7 counter to the spring 131 is generated by the current in the coil 1 and is assisted by the hydraulic reaction in the cell 26 which generates a force added to that generated by the coil and opposed to that generated by the prestressed spring 131. By reducing the intensity of the current in the coil, since the pressure has fallen in the motor 20, the hydraulic reaction force attributable to the cell 26 decreases and the slide moves in the other direction, reclosing communication between the motor 20 and the chamber 11 and therefore the reservoir 24 and subsequently restoring communication between the source 22 and the motor 20 by way of the restriction 42 which allows a less rapid increase of pressure in the motor 20. If the intensity of the current in the coil is increased, the pressure will once again fall in the motor 20, since communication between the motor 20 and the reservoir 24 by way of the groove 59 and the chambers 11 and 15 will be reopened.

It can therefore be seen that an increase of the current in the coil results in a reduction of the pressure of the fluid in the motor 20. It can then be seen that, by modulating the current circulating in the coil 1, for example by cutoff, the slide 7 will assume a position which is a function of the pressure prevailing in the cell 26, and by carefully controlling this current the desired fluid pressure can be applied to the motor 20. In fact, the hydraulic reaction generated in the cell 26 will automatically open or close communication between the motor 20 and the source of fluid under pressure 22 and between the motor 20 and the reservoir 24 for each specific value of the intensity of the current circulating in the coil 1.

Figure 2:
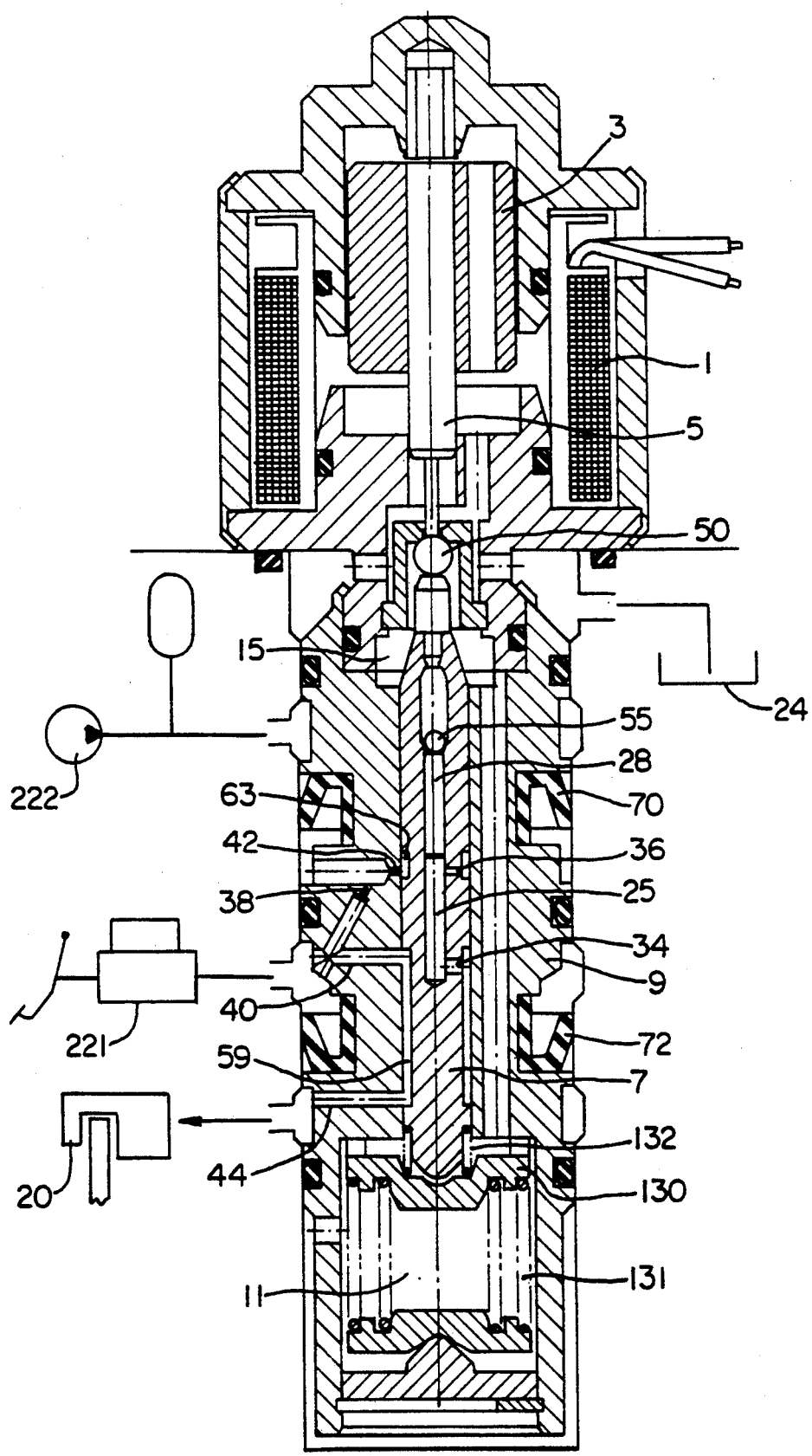
FIG. 2 shows diagrammatically, in section, the system of FIG. 1 with some additional functions.

FIG. 2 has provided the system illustrated in FIG. 1 with some additional functions, and an average person skilled in the art will easily understand the importance of these improvements. Here, as in anti-lock braking systems for the wheels of a vehicle, the source of fluid under pressure 22 has been replaced by two separate sources. One 221 is a hydrostatic source, for example a master cylinder controlled by the brake pedal of the vehicle thus equipped, and the other 222 is a hydrodynamic source, for example a pump connected to an accumulator. A seal 70 is arranged at the inlet of the hydrodynamic source 222, so as to form a non-return valve preventing the fluid of the hydraulic circuit from rising towards the source 222. A radial duct 36 puts in communication the cell 26 and a groove 63 which is made on the periphery of the slide 7 and which, at rest, is opposite the conduit 42 where the hydrodynamic source 222 is connected. The fluid coming from this source 222 must pass via the seal 70, the conduit 42, the cell 26, the conduit 34, the groove 59 and the conduit 44 in order to reach the motor 20. The conduit 42 is therefore advantageously a restriction which makes it possible to control the increase in the pressure of the fluid in the motor 20 after a relief of this. A restriction 38 is likewise provided upstream of the conduit 42 in order to connect it to the hydrostatic source 221 and reduce the pulsations transmitted to the hydrostatic source 221 and more specifically to the driver's foot. The groove 59 has been modified so that the hydrostatic source 221 is isolated from the motor 20 as soon as the solenoid valve is energized, thus avoiding the need to add a pilot slide for the system.

It will be appreciated, of course, that the hydrodynamic source 222 is at rest at the same time as the solenoid valve.

Finally, another seal 72 is arranged between the motor 20 and the conduit 40 connected to the hydrostatic source 221, so as to form a non-return valve useful for allowing the rapid expansion of the fluid under pressure.

Although only some embodiments of the invention have been described, it is clear that an average person skilled in the art can make many modifications to it, without departing from the scope of the invention, as defined by the accompanying claims.

What we claim is:

1. A pressure-regulating system for a hydraulic circuit, comprising at least one generator of fluid under pressure, a hydraulic motor and a reservoir of fluid under low pressure, and a solenoid valve controlled by a computer and comprising an electrical coil and a sliding magnetic core controlling a slide which slides in a bore provided in a body, said slide defining two chambers arranged on either side of the slide in said bore, a hydraulic cell communicating continually with said hydraulic motor and determining a reaction force added to the force generated by said coil and counter to prestressed elastic means and to a return spring returning said slide and said core to a rest position, said cell being defined by a blind bore made in said slide while a needle bearing on said body closes said cell substantially sealingly, and a radial duct in the slide putting the cell in communication with a groove provided on a periphery of said slide, so that an increase in the force generated by said coil results in a reduction of fluid pressure communicated to the hydraulic motor.

2. The pressure-regulating system according to claim 1, wherein said elastic means is formed by at least one spring seated in one of said chambers.

3. The pressure-regulating system according to claim 2, wherein said return spring is seated between said elastic means and said slide.

4. A pressure-regulating system for a hydraulic circuit, comprising at least one generator of fluid under pressure, a hydraulic motor and a reservoir of fluid under low pressure, and a solenoid valve controlled by a computer and comprising an electrical coil and a sliding magnetic core controlling a slide which slides in a bore provided in a body, said slide defining two chambers arranged on either side of the slide in said bore and the chambers communicating with one another, a hydraulic cell communicating with said hydraulic motor and determining a reaction force added to the force generated by said coil and counter to prestressed elastic means and to a return spring returning said slide and said core to a rest position, said cell being defined by a blind bore made in said slide while a needle bearing on said body closes said cell substantially sealingly, and a radial duct putting the cell in communication with a groove provided on a periphery of said slide, so that an increase in the force generated by said coil results in a reduction of fluid pressure communicated to the hydraulic motor, and the solenoid valve including a normally closed valve being arranged between one of said chambers and the reservoir so as to isolate the hydraulic circuit from the reservoir when the solenoid valve is not energized and to communicate the hydraulic circuit with the reservoir when the solenoid valve is energized.

* * * * *